W. P. PENN.

THRASHING-MACHINE.

No. 6,910. Reissued Feb. 8, 1876.

Witnesses
J. B. Connolly
J. Fillerton

By

Worden P. Penn
Connolly Bros

Inventor

Attorneys

UNITED STATES PATENT OFFICE.

WORDEN P. PENN, OF BELLEVILLE, ILLINOIS.

IMPROVEMENT IN THRASHING-MACHINES.

Specification forming part of Letters Patent No. 32,582, dated June 18, 1861; reissue No. 6,910, dated February 8, 1876; application filed June 20, 1874.

*To all whom it may concern:*

Be it known that I, WORDEN P. PENN, of Belleville, in the county of St. Clair and State of Illinois, have invented certain new and useful Improvements in Thrashing-Machines; and I do hereby declare the following to be a full, clear, and exact description of the invention, such as will enable others skilled in the art to which it pertains to make and use it, reference being had to the accompanying drawings, which form part of this specification, in which—

Figure 1:
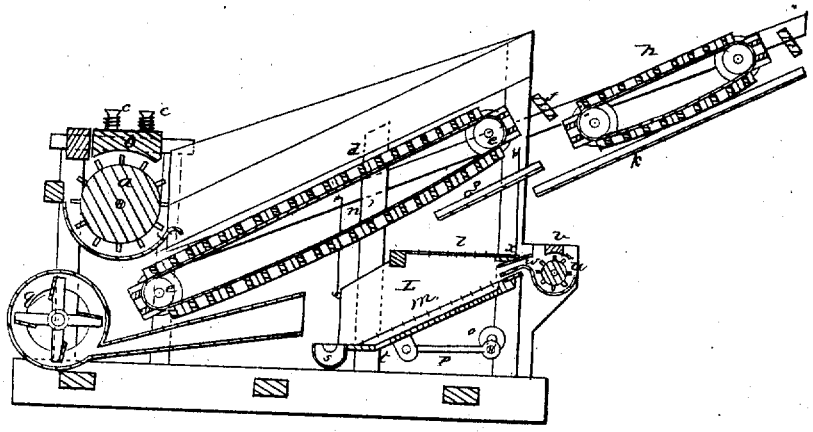
Figure 2:
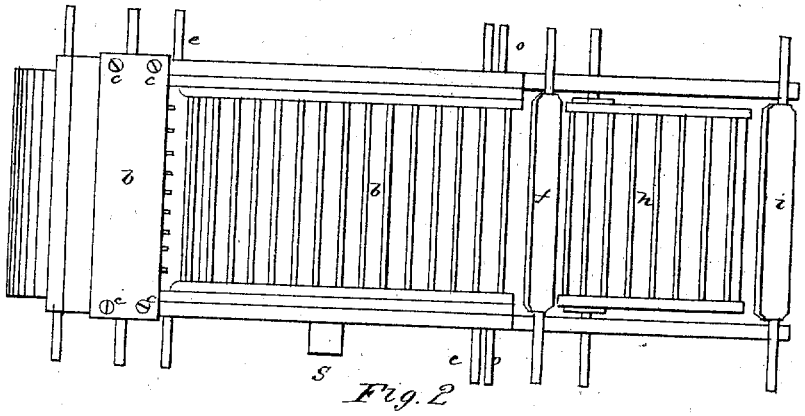

Figure 1 is a sectional elevation of my improved thrashing-machine, showing arrangement and combination of parts. Fig. 2 is a plan view of the same.

This invention has relation to thrashing-machines, the improvements upon which are hereinafter fully described, and specifically set forth in the claims.

Referring to the accompanying drawings, *a* is a thrashing-cylinder fitted with teeth, and of the ordinary construction; and *b* is the concave to the same. This concave is not screwed fast to the frame, but is pressed down upon it above the thrashing-cylinder by springs *c c* on screw-bolts which pass through the ends of the concave, and are screwed to the frame of the machine. *d* is a separator-belt working around the pulleys on the shafts *e e*. This separator-belt is a close canvas belt extending across the machine, with its edges working under projecting pieces of the frame which prevent the falling of the grain over the sides.

The bars of the separator are made in pairs, and secured to the belt in such a manner that they pass readily around the pulleys on which it works. *f* is a beater. *g* is an inclined plane or deflector, which I prefer to make of tin-plate or other metal. *h* is a second separator-belt, constructed in a manner similar to the belt before described. *i* is a second beater. *k* is also a metal deflector. L is a shoe containing the riddles or sieves *l* and *m*, and hanging by the suspenders *n n*.

The shoe is shaken to and fro by the rotation of the crank-shaft *o* operating through the pitman *p*. The motion thus communicated to the shoe is in a direction lengthwise of the frame, and consequently exercises none of the transverse racking that is inseparable from the ordinary bell-crank, and is so destructive to the machine.

*q* is a fan, placed, for convenience of construction and operation, in front of the separator-belt *d*, and under and slightly forward of the cylinder *a*. *r* is the nozzle of the fan, leading under the separator *d* to the riddle-shoe L. *s* is the grain spout or leader from the shoe. *t* is an opening for the delivery of the "cheat" from the shoe. *u* and *v* are a thrashing-cylinder and a concave constituting a second thrasher. This secondary or tailing thrasher is fitted with plates forming a spout, *w*, by which the thrashed grain is delivered upon the riddle *m*.

The various motions of the machine are obtained and transferred by the ordinary gearing and belts.

The operation of my improved machine is as follows: The grain is fed into the machine between the cylinder *a* and concave *b*, and is thrashed by their combined action, and if too much should be thrust into the machine the concave will be permitted to yield by the compression of the spring *c*, and thus avert the danger of breakage. It is then carried by the separator-belt *d* over the beater *f* to the second separator-belt *h*. The loose grain separated by the belt *d* and the beater *f* falls upon the inclined plane or deflector *g*, and is delivered upon the riddle or screen *l*. The straw is carried by the second separator to the second beater, and thence leaves the machine. The grain separated by this additional treatment falls upon the deflector *k* and is delivered to the riddle *l*, that sifts the grain upon the riddle *m*, by which it is screened from the cheat and dust and delivered into the spout *s*, that carries it out of the machine. The cheat falls through the opening *t* in the bottom of the shoe. The shoe L and its riddles *l* and *m* are operated by the crank-shaft *o*, and are subjected to the winnowing influence of the blast from the fan *q* conducted by the nozzle *r*, and directed over the apron *x* toward the rear of the machine. The heads of grain that cannot pass through the upper screen *l* are thus transferred, by the combined action of the blast and the longitudinal motion of the shoe, to the tailings-thrasher.

Having fully described my invention, I claim—

1. The tailings-thrasher and riddle-shoe in combination, when all are arranged as shown and described.

2. The combination of the blast-fan, the longitudinally-vibrating riddle-shoe, the stationary trough, and the tailings-thrashing cylinder, for the purpose stated.

3. The combination of the concave *b* with the screw-bolts and springs *c*, for the purpose described.

In testimony that I claim the foregoing I have hereunto set my hand this 26th day of May, 1874.

WORDEN P. PENN.

Witnesses:
A. T. PRIMM,
ALEX. CHAPPIE.